United States Patent [19]

Duran

[11] Patent Number: 5,073,075
[45] Date of Patent: Dec. 17, 1991

[54] PANEL HOLE CLOSURE ASSEMBLY

[75] Inventor: John A. Duran, Glendora, Calif.

[73] Assignee: Avibank Mfg., Inc., Burbank, Calif.

[21] Appl. No.: 638,689

[22] Filed: Jan. 8, 1991

[51] Int. Cl.⁵ .................................... F16B 21/00
[52] U.S. Cl. .................................. 411/552; 411/349; 411/378
[58] Field of Search .............. 411/337, 347, 549, 349, 411/554, 555, 350, 357, 366, 378, 422, 999, 548, 552, 550

[56] References Cited

U.S. PATENT DOCUMENTS

| 2,216,385 | 10/1940 | Chobert | 411/552 |
| 4,267,615 | 5/1981 | Nealy | 411/347 X |

FOREIGN PATENT DOCUMENTS

| 501275 | 4/1954 | Canada | 411/349 |
| 631707 | 6/1936 | Fed. Rep. of Germany | 411/349 |
| 1012778 | 7/1957 | Fed. Rep. of Germany | 411/351 |
| 918302 | 2/1947 | France | 411/555 |
| 353731 | 1/1938 | Italy | 411/349 |
| 608016 | 5/1978 | U.S.S.R. | 411/337 |
| 359190 | 10/1931 | United Kingdom | 411/349 |
| 822016 | 10/1959 | United Kingdom | 411/554 |

Primary Examiner—Rodney M. Lindsey
Attorney, Agent, or Firm—Poms, Smith, Lande & Rose

[57] ABSTRACT

A panel for assembly for closing off an irregularly configured hole in a panel. The assembly has a housing with a head at one end and a shaft at the other end extending through the hole with a plunger mounted in the housing. A spring biased plate configured to the hole is mounted on the outside of said housing. The plate is fixed to the plunger so that it moves when the plunger is moved. The plunger is indexed to the housing so that it can move first in an vertical direction to a position where the plate is spaced from the head of the housing, then be rotated to a position whereby the plate also rotates with respect to the housing. In this manner, the plate can move first from the hole in the panel to a position away from the hole in the panel.

28 Claims, 5 Drawing Sheets

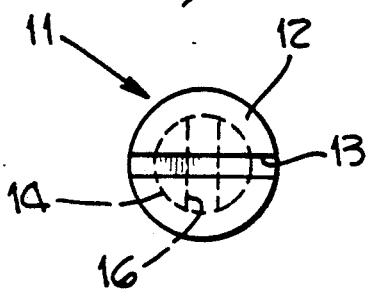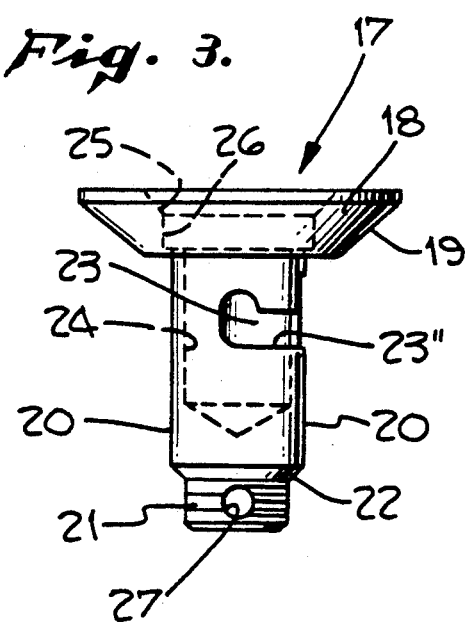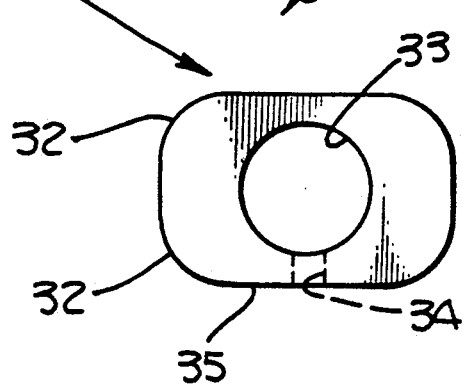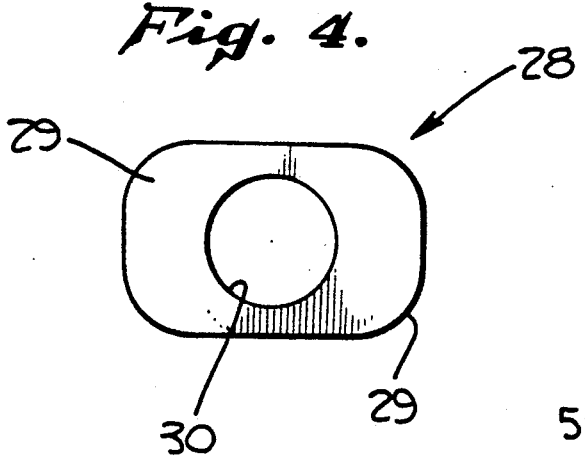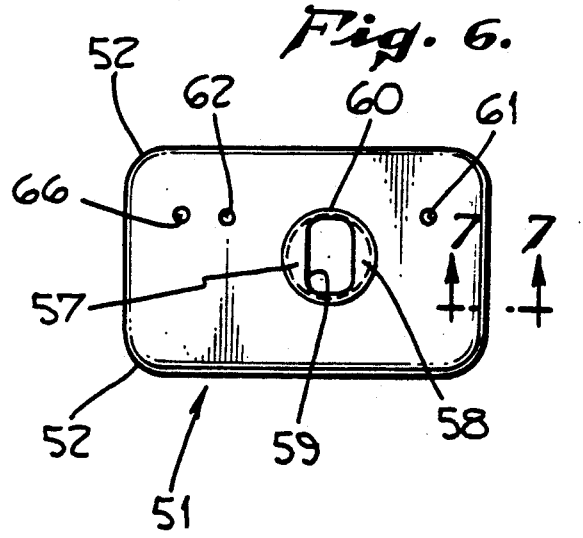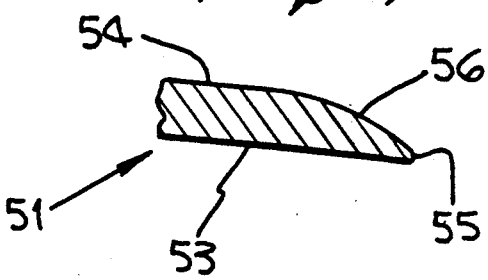

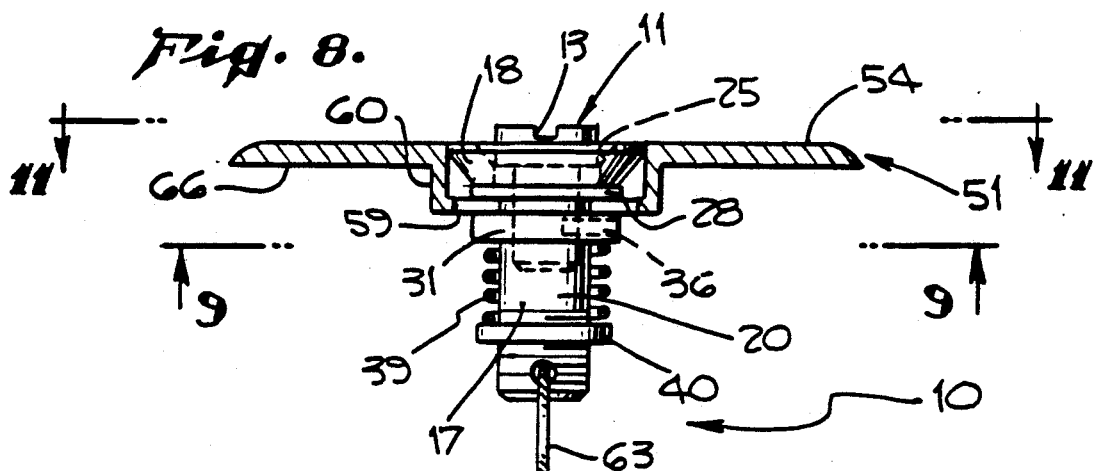
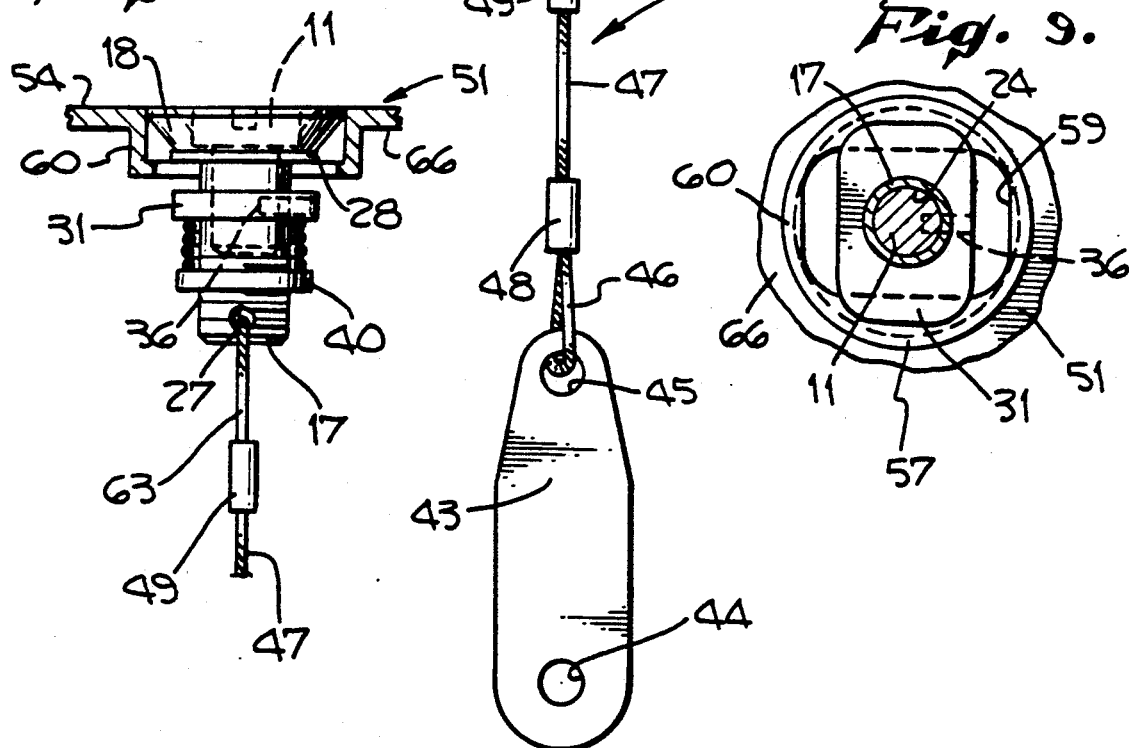
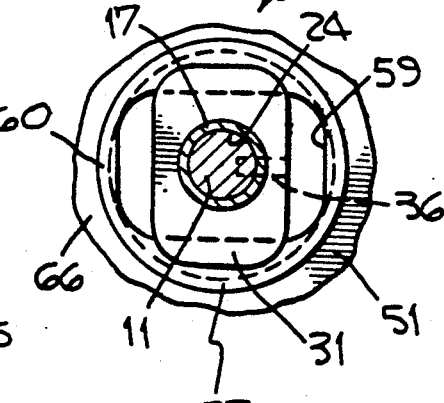
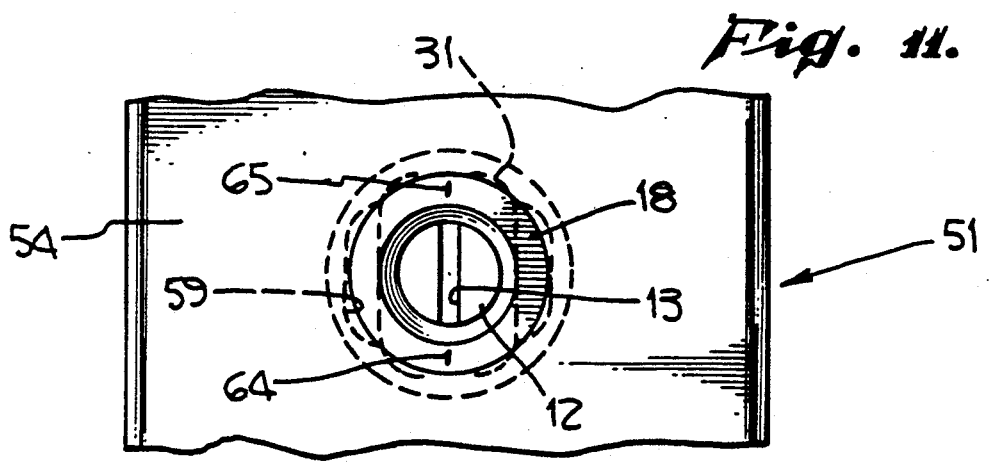

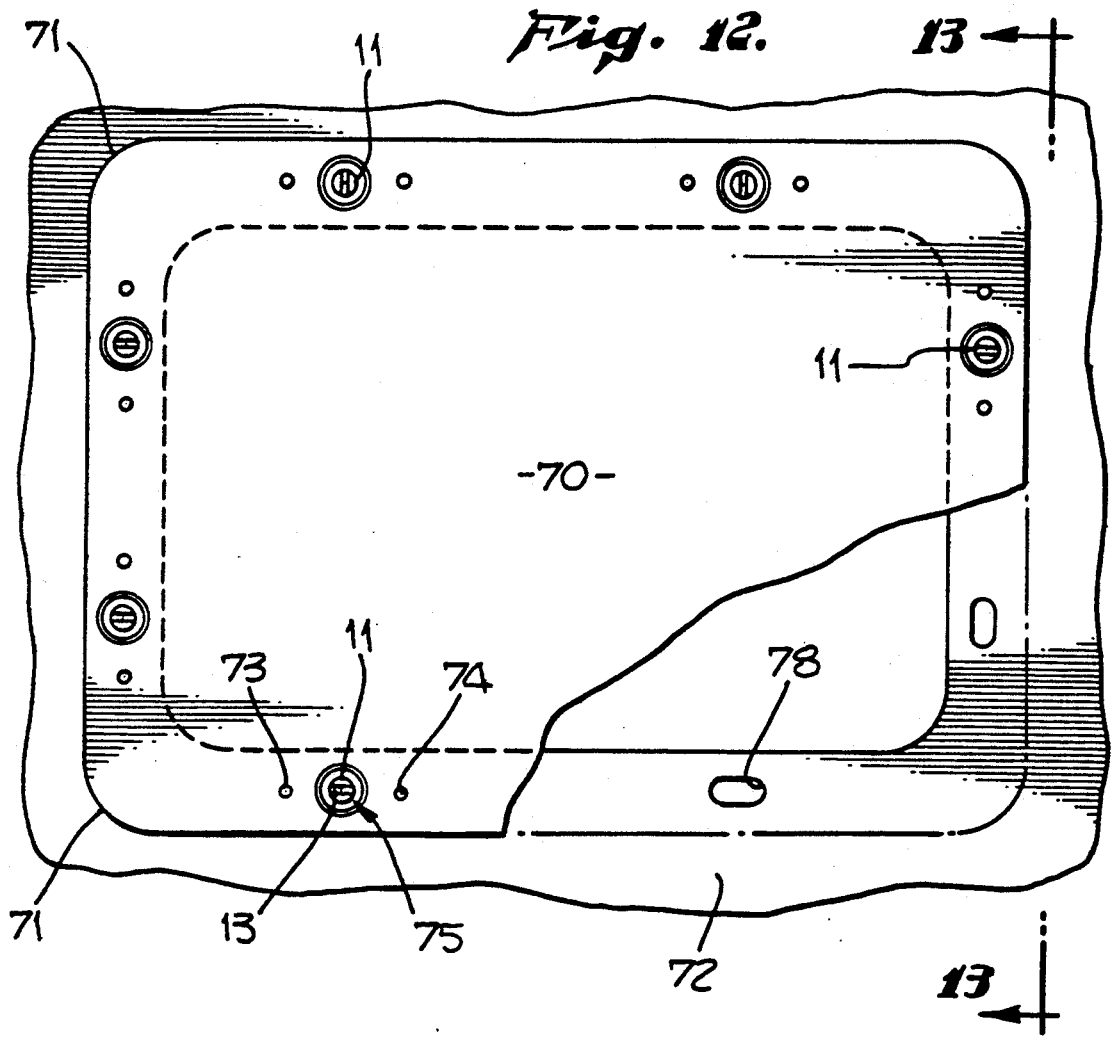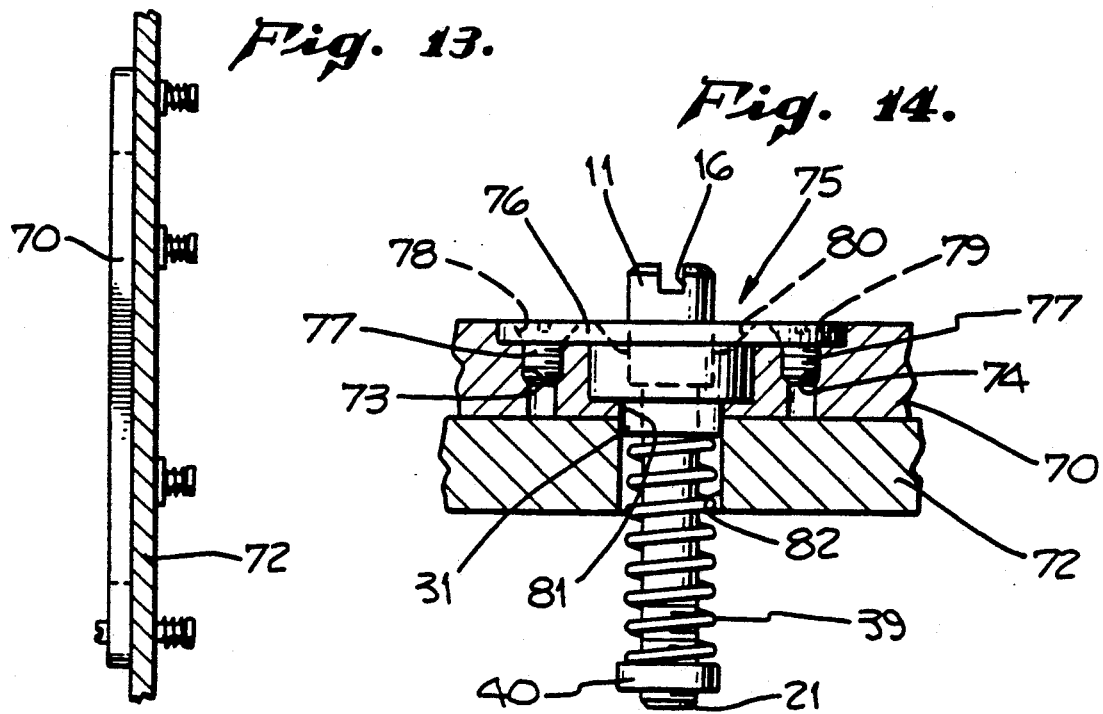

PANEL HOLE CLOSURE ASSEMBLY

BACKGROUND OF THE INVENTION

1. The invention relates to panel fasteners; and, more particularly, to assemblies for closing off holes in panels.

2. Description of the Prior Art

Certain panels, such as aircraft panels, have holes therethrough which should be normally closed off yet have easy access therethrough when needed. Such access should be possible in a way in which the hole can be easily and quickly re-closed without loss or misplacement of the closing portion of the assembly.

There is thus a need for a panel assembly which can close off such holes.

SUMMARY OF THE INVENTION

It is an object of this invention to provide a panel fastener which, in a first position, provides access through a hole in a panel and, in a second position, seals off the hole through the panel.

It is a further object of this invention to carry out the foregoing object in a manner whereby the head of the assembly is flush with the outer surface of the panel when in the sealing position.

It is still further an object of this invention to provide such a panel fastener which can simultaneously removably secure an abutting substructure to said panel.

These and other objects are preferably accomplished by providing a panel assembly which closes off an irregularly configured hole in a panel. The assembly has a housing with a head at one end and a shaft at the other end extending through the hole with a plunger mounted in the housing. A spring biased plate configured to the hole is mounted on the outside of the housing. The plate is fixed to the plunger so that it moves when the plunger is moved. The plunger is indexed to the housing so that it can move first in a vertical direction to a position where the plate is spaced from the head of the housing, then be rotated to a position whereby the plate also rotates with respect to the housing. In this manner, the plate can move first from the hole in the panel to a position away from the hole in the panel.

In one embodiment of the invention, the panel can be secured to an aircraft skin normally closing off a hole through the skin. The assembly can be secured internally so as not able to be lost or misplaced. In another embodiment of the invention, a plurality of assemblies can be used to removably secure a panel to an abutting substructure having similarly configured aligned holes therethrough.

BRIEF DESCRIPTION OF THE DRAWING

FIGS. 2, 3, 4, 5 and 6 are views taken along lines 2—2; 3—3; 4—4; 5—5; and 6—6, of FIG. 1, respectively;

FIG. 7 is a detailed enlarged view taken along lines 7—7 of FIG. 6;

FIG. 8 is a vertical assembled view, partly in section, of the parts of FIGS. 1 to 7;

FIGS. 9 and 11 are views taken along lines 9—9 and 11—11, respectively, of FIG. 8;

FIG. 10 is a vertical view of a portion of the assembly of FIG. 8, the head of the plunger being flush with the upper surface of the panel;

FIG. 12 is a top plan view, partly cut away, of a modification of the invention;

FIG. 13 is a vertical sectional view of the parts of FIG. 12 taken along lines 13—13 of FIG. 12;

FIG. 14 is a vertical view, partly in section, of one of the panel assemblies of the arrangement of FIGS. 12 and 13;

DESCRIPTION OF THE PREFERRED EMBODIMENT

Figure 1:
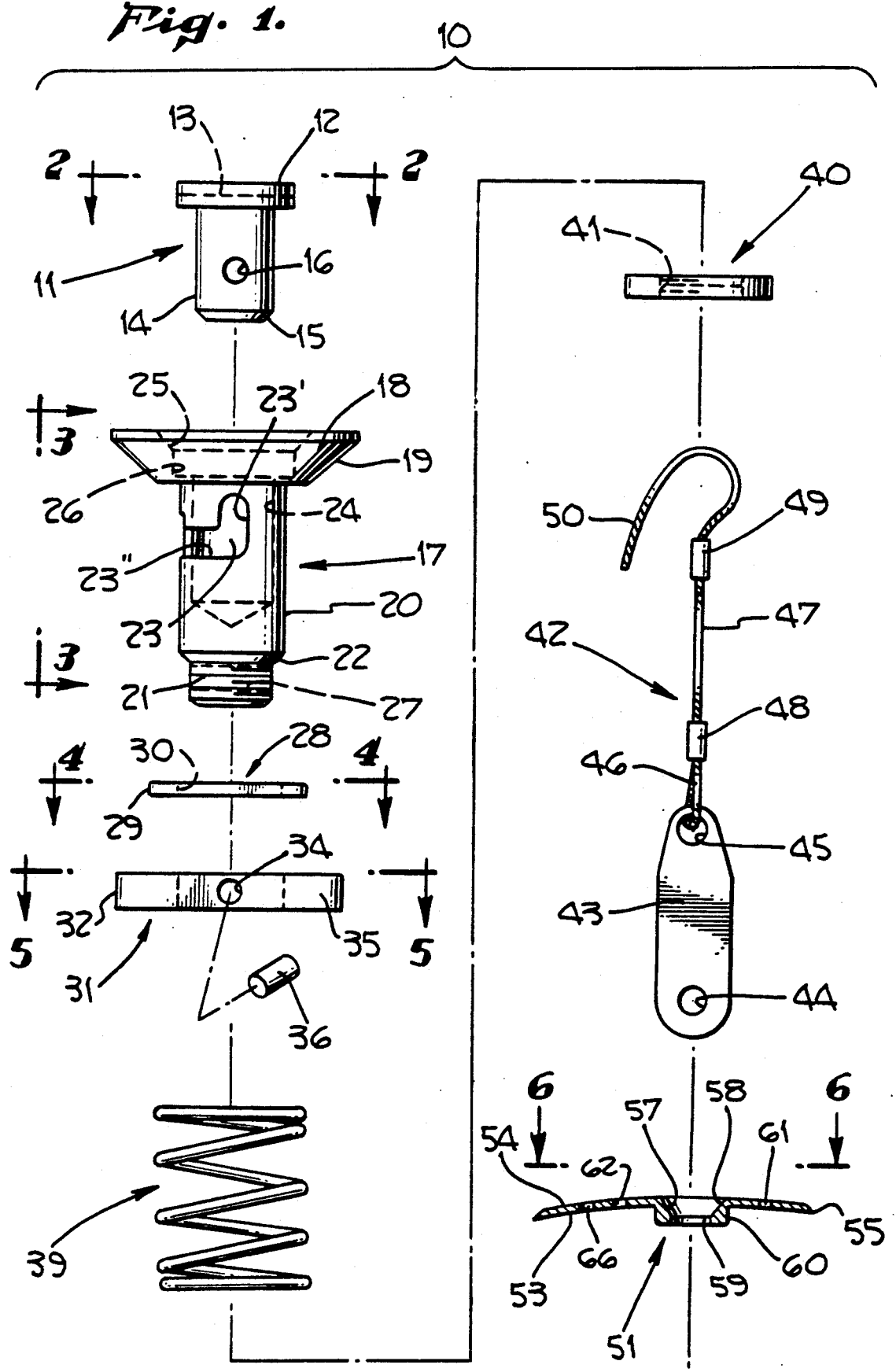
FIG. 1 is an exploded view of a panel fastener according to the teachings of the invention.

Referring now to FIG. 1 of the drawing, a removable installation plate assembly 10 is shown in exploded view. Assembly 10 includes a plunger 11 having an enlarged preferably circular head 12, with a slot 13 therein (FIG. 2) at one end and a cylindrical shaft 14 at the other end terminating in a chamfered nose 15. A hole 16 (FIG. 1) extends all the way through shaft 14 adjacent nose 15.

A main housing 17 is provided in assembly 10 having an enlarged head 18 at one end with a tapered undersurface 19 and an elongated cylindrical shaft 20 terminating in a reduced diameter threaded portion 21. A tapered portion 22 leads from cylindrical shaft 20 to portion 21. An L-shaped slot 23 is formed in the side wall of cylindrical portion 20 below head 18 communicating with throughbore 24 extending through cylindrical portion 20. A tapered opening 25 in head 18 leads into throughbore 24, a wide diameter opening 26 being provided in head 18 between opening 25 and throughbore 24.

As seen in FIG. 3, a hole 27 extends all the way through threaded portion 21 below tapered portion 22. Hole 27 is aligned with the vertical portion 23, of slot 23 as seen in FIG. 3.

A flat plate 28 (FIG. 1) is provided having a generally rectangular cross-section (FIG. 4) with rounded corners 29 and a throughbore 30. Throughbore 30 is slightly greater in diameter than the outer diameter of portion 20 of housing 17.

Assembly 10 also includes a substantially flat lock plate 31 (FIG. 1) also having a generally rectangular configuration (FIG. 5) with rounded corners 32 and a throughbore 33 also slightly greater in diameter than the outer diameter of cylindrical portion 20 of housing 17. A hole 34 is provided extending through one of the elongated side walls, such as wall 35, of plate 31 into communication with throughbore 33 as seen in dotted lines in FIG. 5.

A cylindrical lock pin 36 (FIG. 1) is provided having an outer diameter related to the inner diameter of hole 34 and of the same length thereof for locking plate 31 to housing 17 as will be discussed.

A coil spring 39 is provided in assembly 10 having an inner diameter slightly greater than the outer diameter of cylindrical portion 20 of housing 17 and an outer diameter preferably slightly less than the outer diameter of plate 31.

A generally circular flat nut 40 is provided in assembly 10 having a threaded throughbore 41 adapted to mate with the threads 21 of the threaded portion 21 of housing 17.

A lanyard assembly 42 is provided as part of the assembly 10, lanyard assembly 42 includes a plate or tab 43 having a hole 44 at one end and a hole 45 at the other end. The loop 46 of an elongated wire 47 is received in hole 45, swaging sleeve 48 swaging the free end of loop 46 to wire 47. A like swaging sleeve 49 is provided on wire 47 adapted to receive therein the free end 50 of wire 47, as will be discussed.

Assembly 10 further includes an installation plate 51 having a generally rectangular cross section (FIG. 6) with rounded corners 52. As seen in FIG. 1, plate 51 is slightly convex, the inner wall 53 having a radius of about 8.80 inches. The outer wall 54 is preferably spaced from the inner wall between about 0.065 to 0.085 inches. The outer edges may be tapered, as a radius of curvature of taper of about 0.010 inches at peripheral tip 55 (FIG. 7) and a radius of curvature of about 0.25 inches at point 56 where the outer wall begins to taper down toward tip 55.

A generally circular hole 57 (FIG. 1) is provided in outer wall 54 generally in the center of plate 51 tapering inwardly and downwardly at tapered wall 58 to a generally rectangular opening 59 (see particularly FIG. 6) formed in a generally cylindrical boss 60 (FIG. 1) integral with and extending from the underside or inner wall 53 of plate 51. Thus, a throughbore is provided through plate 51 having a circular opening tapering into a rectangular opening. Finally, one or more mounting holes 61, 62, 66 (FIG. 6) may be provided through plate 51 between the center and outer edges thereof.

The final assembly of the parts of FIGS. 1 to 7 is shown in FIG. 8. Plate 28 is assembled on to cylindrical portion 20 of housing 17 until it abuts against the underside of tapered portion 18 and is welded or otherwise assembled thereto. Alternatively, plate 28 and housing 17 may be formed of one integral molded piece.

Plunger 11 is now inserted through opening 25 into communication with opening 24 and plate 31 is now mounted over cylindrical portion 20 of housing 17. Pin 36 is staked through hole 34, through slot 23 and into hole 16 in plunger 11. Thus, plate 31 is mounted to plunger 11 and moves up and down on housing 17 via the vertical leg 23, of slot 23. Plate 31 also moves back and forth in the horizontal leg 23,, of slot 23 when plunger 11 is turned or rotated about its longitudinal axis by a suitable tool (not shown) inserted into the slot 13 in head Spring 39 is now mounted over cylindrical portion 20 of housing 17 abutting at one end against the underside of plate 31 at the other end against nut 40 threaded onto threaded portion 21 of housing 17.

The free end 50 of lanyard assembly 42 is now inserted through hole 27 (see also FIG. 3) in housing 17 and sleeve 49 is swaged thereto to form loop 63 (FIG. 8).

Tab 43 is of a width sufficient to extend through openings 57, 58 and 59 in plate 51 so that the end of lanyard assembly 42 having tab 43 thereon is inserted down through plate 51 until plate 31 mates into rectangular hole 59. This is the relaxed position of assembly 10, the head 12 of plunger 11 extending slightly above the outer surface of outer wall 54 of plate 51.

Plunger 11 can now be pushed downwardly, by a suitable tool engaging slot 13 in head 12, moving plate 31 downwardly out of hole 59, and rotated so that plate 31 moves to a position straddling or extending transversely across hole 59, as seen in FIG. 9. The upper surface of the head 12 of plunger 11 is flush with the upper surface of plate 51 as seen in FIG. 10.

The assembly 10 can be used on an aircraft or the like with plate 51 overlying and otherwise closing off an access hole through the skin of the aircraft. Rivets or screws (not shown) inserted through holes 61, 62 and 66 and into the aircraft skin are used to secure plate 51 in position on the aircraft. The hole 44 in tab 43 can be used to secure assembly 10 in a desired location on the interior of the aircraft so assembly 10 cannot get lost. The spring 39 is self compensating preventing the assembly 10 from rattling during use.

As seen in FIG. 11, indicia 64, 65, in the form of lines or the like, may be provided in the outer surface of head 18, aligned with slot 13 when plunger 11 is in the FIG. 10 position, to indicate the locked position of assembly 10. Plunger 11 can be turned either clockwise or counterclockwise. Access to the interior of the aircraft can quickly and easily be provided through hole 59. Nut 40 can be selectively tightened or loosened to compress or decompress spring 39 to the desired tension.

As seen in FIG. 12, wherein line numerals refer to like parts of the assembly of FIGS. 1 to 11, instead of assembly 10 having one installation plate 51 and one plunger 11, and related structure, the teachings herein can be applied to a panel fastener. Thus, as seen in FIGS. 12 and 13, a large generally rectangular panel 70 is shown having rounded corners 71. Panel 70 is adapted to be removably secured to an abutting substructure 72 (FIG. 13) as will be discussed.

Figure 15:
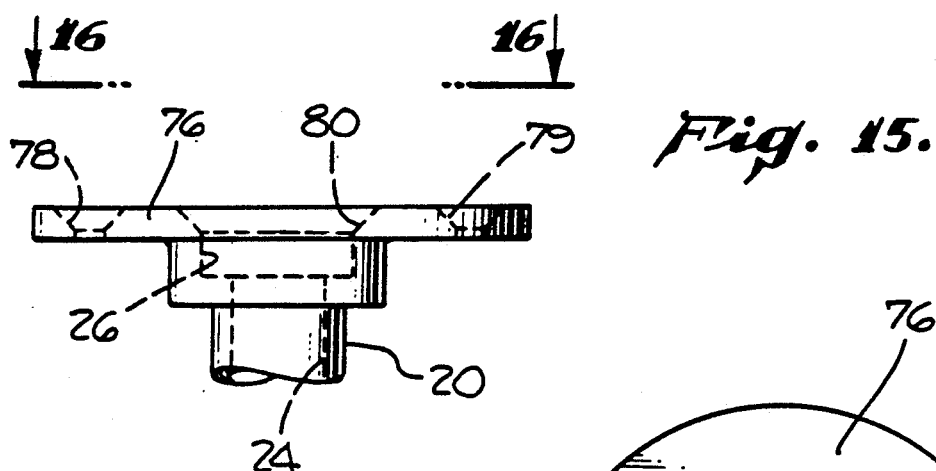
FIG. 15 is a vertical view of a portion of one of the components of, the assembly of FIG. 14.
Figure 16:
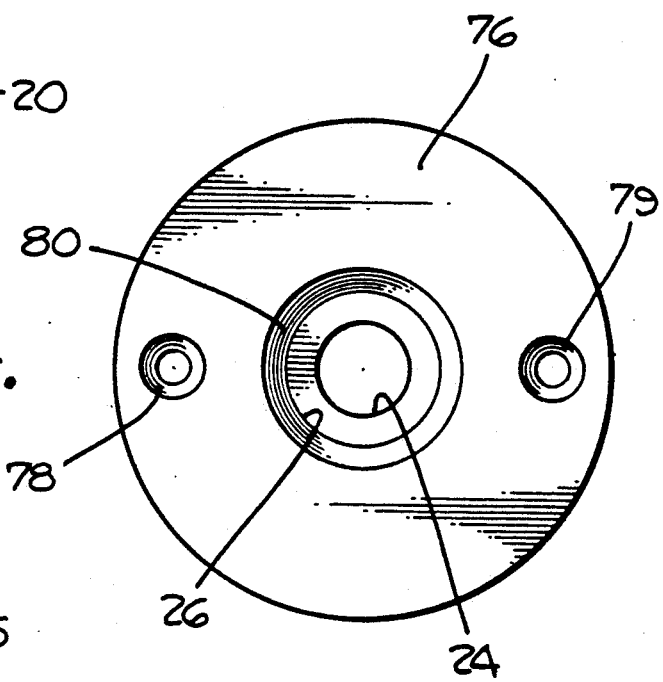
FIG. 16 is a view taken along lines 16—16 of FIG. 15.

As seen in FIGS. 14 and 15, housing 75 differs from housing 17 of the embodiment of FIG. 1 in that circular head 76 (see also FIG. 16) has a pair of threaded countersunk holes 78, 79 on each side of central countersunk hole 80, the latter being otherwise identical to hole 25 of the embodiment of FIG. 1.

As seen in FIG. 14, like threaded holes 73, 74 are provided in panel 70 aligned with holes 78, 79. Screws 77 threaded into holes 78, 73 and 79, 74 thus securing the head 76 of housing 75 to panel 70. The hole 81 through panel 70 is similar to hole 59 in plate 51 (i.e., configured similarly to plate 31).

A like configured opening 82 is provided through substructure 72.

The lanyard assembly 42 is not necessary in the embodiment of FIGS. 12 to 16 nor is the hole 27. In the embodiment of FIGS. 12 to 16 (eight panel fastener assemblies are shown evenly spaced about panel 70).

Figure 17:
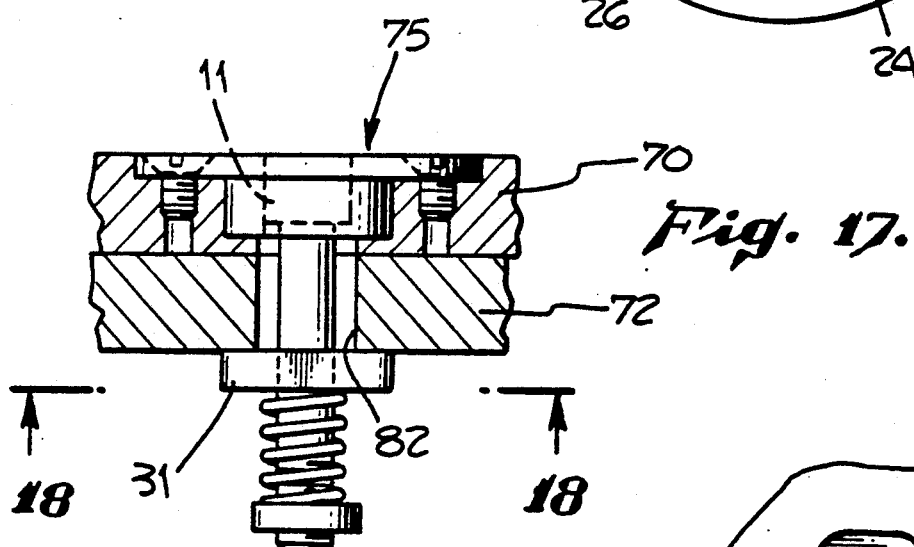
FIG. 17 is a view similar to FIG. 14 showing the panel-substructure locking position of the panel assembly.
Figure 18:
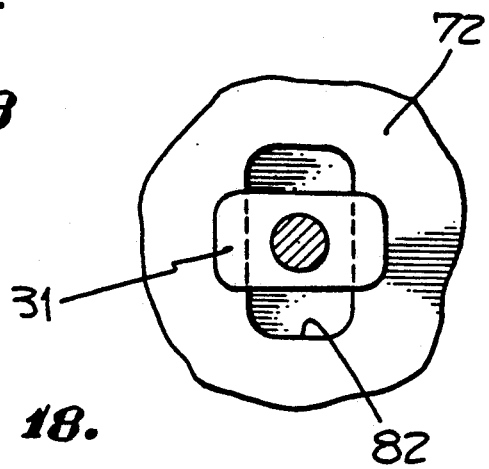
FIG. 18 is a view taken along lines 18—18 of FIG. 17.

As seen in FIG. 14, in the relaxed position, plunger 11 extends above the surface of head 76. Plate 31 is disposed within aligned holes 81, 82 with end 21 extending below substructure 72. As seen in FIG. 17, when plunger 11 is moved downwardly and turned via slot 13 as heretofore discussed, plate 31 is moved first downwardly through opening 82 in substructure 72, then turned crosswise to opening 82, as seen in FIG. 18, to straddle opening 82 locking panel 70 to substructure 72 until plunger 11 is released by reversing the aforementioned steps.

In this manner, the plunger 11 and plate 31 and related structure can be used as both panel fasteners to removably lock a panel to a substructure and the close off holes in a plate or panel. When the assembly 10 is properly locked, assembly 10 cannot be inadvertently unlocked. Pin 36 must be pushed down and rotated to allow the locked plate 31 to return to its unlocked position. The configuration of slot 23 is such that it eliminates inadvertent release under vibration.

Although screws 77 have been used to secure the assembly to the panel, obviously other types of securing means, such as rivets, may be used.

There thus has been disclosed an assembly which can be used to removably close off an opening in aircraft panel or the like or used as panel fasteners to removably secure a panel to a substructure.

I claim:

1. An assembly for closing off an irregularly configured hole in a panel comprising:
   a housing having an enlarged head with a countersunk opening therein at one end adapted to fit in an opening in said panel leading into said hole, said housing having an elongated shaft at the other end terminating in a nose portion, and a throughbore extending from said countersunk opening in said head at least partway through said housing along generally the longitudinal axis thereof;
   a plunger having an enlarged head conforming to said countersunk opening at one end and an elongated shaft at the other end extending into said throughbore, said enlarged head of said plunger having a slot therein for receiving a tool therein for rotating the same;
   a plate having an outer periphery conforming to said irregularly configured hole in said panel mounted on the outside of said shaft of said housing between the head of said housing and the nose portion thereof;
   biasing means on the outside of said shaft of said housing between said plate and said nose portion normally biasing said plate toward said head of said housing; and
   indexing means locking said plate to the shaft of said plunger permitting movement of said plate in a direction toward the nose portion of said housing when said plunger is moved downwardly against the bias of said biasing means yet permitting rotation of said plate about the longitudinal axis of said housing when said plunger is rotated in a direction about its longitudinal axis.

2. In the assembly of claim 2 wherein said nose portion has a threaded portion on the exterior thereof and a nut threaded on said threaded portion of said nose portion engaging said biasing means.

3. In the assembly of claim 2 wherein said biasing means is a coiled spring bearing at one end against said plate and at the other end against said nut.

4. In the assembly of claim 1 wherein said opening in said panel leading into said hole is configured similarly to the head of said housing.

5. In the assembly of claim 1 including an elongated lanyard coupled to said nose portion.

6. In the assembly of claim 5 wherein said lanyard terminates in a tab.

7. In the assembly of claim 1 wherein said housing has a flange on the underside of the enlarged head thereof providing a stop for said plate.

8. In the assembly of claim 1 wherein said indexing means includes a pin extending through said plate and into said plunger securing said plate to said plunger.

9. In the assembly of claim 8 wherein said indexing means further includes an L-shaped slot extending through the outer wall of the shaft of said housing into communication with the throughbore thereof, said slot having a first vertical leg and an interconnected second horizontal leg, said pin riding in said slot.

10. In the assembly of claim 1 wherein said irregularly configured hole and the outer periphery of said plate are generally rectangular in cross-section.

11. In the assembly of claim 1 wherein said plate has a plurality of spaced holes therethrough.

12. In the assembly of claim 1 wherein said panel has an inner surface and an outer surface with indicia on the outer surface thereof cooperating with the orientation of said slot in the head of said plunger to indicate the position of said shaft of said plunger within said housing.

13. In the assembly of claim 1 wherein the head of said plunger is flush with the head of said housing when said plate is in a position disposed away from said head of said housing against said biasing means.

14. In the assembly of claim 1 wherein said plate is generally rectangular in its outer periphery.

15. In the assembly of claim 1 wherein said panel has a plurality of spaced irregularly configured holes at spaced locations thereon, each of said holes having one of said housing mounted in an opening therein communicating with its respective hole, each of said housings having one of said plungers mounted therein with one of said plates mounted on each of said housings, one of said biasing means being mounted on each of said housings with one of said indexing means associated with each of said housings and said one of said plungers mounted therein.

16. In the assembly of claim 15 including securing means associated with said panel and said enlarged head of each of said housings for fixedly securing said housings to said panel.

17. In the assembly of claim 15 including a substructure having a blind side and an access side, said blind side being adapted to abut against said panel, said substructure having an opening therethrough configured similarly to said irregularly configured hole, said shaft of said housing and said biasing means extending through said opening in said substructure to the blind side thereof.

18. In the assembly of claim 15 wherein said nose portion has a threaded portion on the exterior thereof and a nut threaded on said threaded portion of said nose portion engaging said biasing means.

19. In the assembly of claim 18 wherein said biasing means is a coiled spring bearing at one end against said plate and at the other end against said nut.

20. In the assembly of claim 15 wherein said opening in said panel leading into said hole is configured similarly to the head of said housing.

21. In the assembly of claim 15 wherein said housing has a flange on the underside of the enlarged head thereof providing a stop for said plate.

22. In the assembly of claim 15 wherein said indexing means includes a pin extending through said plate and into said plunger securing said plate to said plunger.

23. In the assembly of claim 22 wherein said indexing means further includes an L-shaped slot extending through the outer wall of the shaft of said housing into communication with the throughbore thereof, said slot having a first vertical leg and an interconnected second horizontal leg, said pin riding in said slot.

24. In the assembly of claim 15 wherein said irregularly configured hole and the outer periphery of said plate are generally rectangular in cross-section.

25. In the assembly of claim 15 wherein said plate has a plurality of spaced holes therethrough.

26. In the assembly of claim 15 wherein said panel has an inner surface and an outer surface with indicia on the outer surface thereof cooperating with the orientation of said slot in the head of said plunger to indicate the position of said shaft of said plunger within said housing.

27. In the assembly of claim 15 wherein the head of said plunger is flush with the head of said housing when said plate is in a position disposed away from said head of said housing against said biasing means.

28. In the assembly of claim 15 wherein said plate is generally rectangular in its outer periphery.

* * * * *